| United States Patent [19] | [11] Patent Number: 4,845,138 |
| --- | --- |
| Robinson et al. | [45] Date of Patent: Jul. 4, 1989 |

[54] FREEZE-THAW STABLE POLYACRYLAMIDE EMULSIONS

[75] Inventors: Peter M. Robinson; Philip D. Raby, both of Columbus; Nguyen Van-Det, Midland, all of Ga.

[73] Assignee: Exxon Chemical Patents Inc., Linden, N.J.

[21] Appl. No.: 182,161

[22] Filed: Apr. 15, 1988

[51] Int. Cl.$^4$ ................................................ C08K 5/15
[52] U.S. Cl. .................................... 524/112; 524/808; 524/809; 524/812; 524/814; 524/815; 524/817; 524/827; 524/829; 524/831; 524/832; 524/833
[58] Field of Search ............... 524/112, 808, 812, 814, 524/809, 815, 817, 827, 829, 831, 832, 833

[56] References Cited

U.S. PATENT DOCUMENTS

| | | | |
|---|---|---|---|
| 3,551,370 | 12/1970 | Dalton | 524/112 |
| 3,666,510 | 5/1972 | Coaker et al. | 524/112 |
| 4,339,371 | 7/1982 | Robinson et al. | 524/310 |

FOREIGN PATENT DOCUMENTS

| | | | |
|---|---|---|---|
| 0045730 | 3/1983 | Japan | 524/112 |
| 0045731 | 3/1983 | Japan | 524/112 |
| 1031472 | 2/1986 | Japan | 524/112 |

*Primary Examiner*—Joseph L. Schofer
*Assistant Examiner*—J. M. Reddick

[57] ABSTRACT

Water-in-oil emulsions of water-soluble polymers, i.e. polyacrylamides, which are subject to freeze-thaw degradation are stabilized against repeated freeze-thaw cycles by incorporating specific substituted succinic anhydrides.

13 Claims, No Drawings

FREEZE-THAW STABLE POLYACRYLAMIDE EMULSIONS

This is a division of application Ser. No. 054,655, filed May 27, 1987, now U.S. Pat. No. 4,785,036.

This invention relates generally to water-soluble polymers dispersed in inverse, i.e. water-in-oil, emulsions. More particularly, the present invention relates to water-in-oil emulsions of water-soluble polymers which contain preferably less than about 2% by weight of one or more primary surfactants (emulsion polymerization stabilizers) together with a substituted succinic anhydride. The freeze-thaw stability is provided to the emulsion by the presence of the succinic anhydride compound.

Water-in-oil emulsions containing water-soluble polymers dispersed therein are well known in the art. Such emulsions have found a wide variety of uses, for example, as flocculants in the mining and paper industries and in sewage treatment, and as mobility control agents in enhanced oil recovery. Many of these applications occur in low temperature environments, i.e. below 0° C. and even as low as −10° C., where freezing of the emulsions before use is likely to occur. When such frozen emulsions are thawed for use, there is generally a problem of gel formation and/or a loss of product quality. To overcome this problem in the past the art has been forced to add glycols or inorganic salts to depress the freezing point of the emulsions, or to reduce the amount of water-soluble polymer in the system for a given surfactant level (diluting the polymer or increasing the surfactant), or dehydrating the emulsion, or alternatively using special expensive low-titre surfactants. In view of the fact that all of these proposed solutions has resulted in either reducing the product performance or greatly increasing the cost of the resultant emulsions, there is a continuing need for a method of improving the freeze-thaw stability of such emulsions while at the same time minimizing the total amount of surfactant present in the system. It is well known that using large amounts of surfactants generally penalizes product performance by the interaction of the surfactants with the water-soluble polymer when the emulsion is inverted for use.

The present invention entails adding small but effective amounts of a substituted succinic anhydride compound to a conventional water-in-oil emulsion of a water-soluble polymer to improve the freeze-thaw stability of the resultant emulsion.

U.S. Pat. No. 4,506,051 is directed to water-in-oil emulsions having improved low temperature properties. It incorporates an N,N,-dialkylamide in the emulsion so that the stability of the emulsion upon repeated freeze-thaw cycles or the fluidity of the emulsion at low temperatures such as −20° C. is improved. The water-soluble polymers utilized are copolymers of acrylamide and acrylic acid. It does not teach or suggest the use of the substituted succinic anhydride compounds as freeze-thaw stabilizing agents.

U.S. Ser. No. 816,171, filed Jan. 3, 1986, discloses the use of certain maleic anhydride-based polymeric surfactants as freeze-thaw stabilizers for water soluble polymers. These surfactants are generally high melting point solids with limited oil solubility and this has caused some handling problems.

U.S. Pat. No. 4,022,731 and U.S. Pat. No. 4,022,736 are also directed to freeze-thaw stable, self-inverting, water-in-oil emulsions, wherein the water-soluble polymeric material is a polyacrylamide-based polymer. Neither of these patents suggest the use of a substituted succinic anhydride compound as a freeze-thaw agent.

The above discussion of the prior art indicates that the freeze-thaw stability of water-soluble polymers is a substantial problem in the industry. However, none of the prior art suggests that the addition of a small amount of specific substituted succinic anhydrides would produce water-in-oil emulsions which have good to excellent freeze-thaw stability and excellent mechanical stability.

It is accordingly an object of the present invention to produce water-in-oil emulsions of finely dispersed water-soluble polymeric particles in which the emulsions have improved freeze-thaw stability at a low level of primary surfactants.

It is a further object to prepare emulsions with mechanical properties equivalent to or better than conventional non-freeze-thaw stabilized emulsions while reducing the total amount of stabilizers and/or other additives.

These and other objects will become apparent from the ensuing description.

It has been discovered that the addition of certain substituted succinic anhydrides will provide freeze-thaw stability to water-in-oil water-soluble polymer emulsions which are not freeze-thaw stable and which contain less than about 50 percent by weight water-soluble polymeric solids. In addition, the present invention permits the use of minimum levels of the primary surfactants, merely enough to stabilize the emulsion during polymerization, i.e. less than about 2 percent by weight of the total emulsion. The resultant emulsions also possess excellent mechanical stability.

The substituted succinic anhydrides useful in the present invention have the general formula:

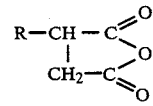

wherein R is alkyl or alkenyl group having about 5 to 30 carbon atoms, preferably about 8 to 18 carbon atoms. Also preferably the group has as little branching as possible and more preferably it is a straight chain. Most preferably R is a straight chain alkenyl group of about 8 to 18 carbon atoms.

Optionally, the R group may contain hydrophobic substituents such as aryl or alkyl-substituted aryl groups.

The substituted succinic anhydride compounds are well known and are commercially available from many sources. Generally, the alkenyl derivatives are prepared by the reaction of maleic anhydride and the appropriate alkene, and the alkyl derivatives by reduction of the alkenyl derivatives.

The substituted succinic anhydride is added to the emulsion either before or after polymerization in an amount effective to provide freeze-thaw stability to the final emulsion. Generally, the amount will be greater than about 0.2 percent by weight based on the total weight of the emulsion and less than 1 percent. More preferably the amount is at least about 0.25 percent. Generally, there is no advantage to adding more than the minimum amount of the anhydride as determined by routine experimentation.

Although the present invention has been found to be independent of the particular emulsion polymerization method employed, certain preferences are delineated in the general description of emulsion preparation which follows.

A preliminary emulsion is made by homogenizing oil and aqueous phases. The oil phase of the emulsion, which generally comprises from about 5 to 35 percent by weight of the total emulsion, is comprised of one or more inert hydrophobic liquids. Preferably, the oil phase comprises about 20 to 30 percent of the emulsion. The oil used may be selected from a large class of organic liquids which are immiscible with water, including liquid hydrocarbons and substituted liquid hydrocarbons. Representative examples of such oils include benzene, xylene, toluene, mineral oils, kerosenes, naphthas, chlorinated hydrocarbons such as perchloroethylene, and the like.

The oil phase also contains the primary surfactants, i.e. conventional emulsion polymerization stabilizers. Such stabilizers are well known to the art to promote the formation and stabilization or water-in-oil emulsions. Normally such emulsifiers have HLB values in the range of about 2 to about 10, preferably less than about 7. Suitable such emulsifiers include the sorbitan esters, phthalic esters, fatty acid glycerides, glycerine esters, as well as the ethoxylated versions of the above and any other well known relatively low HLB emulsifier. Examples of such compounds include sorbitan monooleate, the reaction product of oleic acid with isopropanolamide, hexadecyl sodium phthalate, decyl sodium phthalate, sorbitan stearate, ricinoleic acid, hydrogenated ricinoleic acid, glyceride monoester of lauric acid, glyceride monoester of stearic acid, glycerol diester of oleic acid, glycerol triester of 12-hydroxystearic acid, glycerol triester of ricinoleic acid, and the ethoxylated versions there of containing 1 to 10 moles of ethylene oxide per mole of the basic emulsifier. Thus any emulsifier may be utilized which will permit the formation of the initial emulsion and stabilize the emulsion during the polymerization reaction, but will not provide sufficient freeze-thaw stability to the final emulsion such that the emulsion will pass the freeze-thaw stability test as described in Example I below.

These primary surfactants are used alone or in mixtures and are utilized in as low amounts as is possible since an excess not only increases the cost of the resultant emulsion but also has been found to reduce the performance. As such, all of the primary surfactants should together be used in amounts not greater than about 3% by weight of the total emulsion. Preferably the amount is not greater than about 2%, and most preferably it is less than about 1.8%.

The aqueous phase generally comprises about 95 to 65 percent by weight of the emulsion. Preferably, it comprises about 80 to 70 percent thereof. In addition to water, the aqueous phase contains the monomers being polymerized, generally in an amount of less than about 50 percent preferably about 20 to about 35 percent, by weight of the total emulsion, and generally utilized chain transfer agents, initiators, and sequesterants alternatively, the chain transfer agents, initiators and sequesterants may be added to the system after the preliminary emulsion has been prepared. The initiator may also be added continuously during the polymerization to control the rate of polymerization depending upon the particular monomers used and their reactivities. Further alternatively, the initiator may be present in either the oil or the aqueous phase with the monomers being added either continuously or incrementally thereafter. All of these variations are well known in the art.

Any monomers which, when polymerized or copolymerized, yield water-soluble polymers may be used in the present invention. The term "water-soluble" means that the polymer is soluble in water in an amount of at least 1% by weight. The polymer may be nonionic, anionic with less than about 35, preferably less than 25, mole percent anionicity, or cationic with less than about 15, preferably less than 10, mole percent cationicity. When the anionicity or cationicity are above these amounts, the resultant emulsions are generally inherently freeze-thaw stable and there is no need to add the succinic anhydride to obtain the stability. Examples of monomers useful herein include acrylamide, acrylic acid and its salts, methacylamide, methacrylic acid and its salts, maleic acid and its salts, methyl acrylate, ethyl acrylate, propyl acrylate, methyl methacrylate, ethyl methylcrylate, vinyl acetate, hydroxypropyl acrylate and methacrylate, dimethylaminoethyl acrylate and its methylchloride and methosulfate quaternaries, dimethylaminoethyl methacrylate and its methylchloride and methosulfate quaternaries, diethylaminoethyl acrylate and its methylchloride and methosulfate quaternaries, diethylaminoethyl methacrylate and its methylchloride and methosulfate quaternaries, hydroxyethyl acrylate, hydroxyethyl methacrylate, styrene, acrylonitrile, 2-acrylamide-methylpropane sulfonic acid and its salts, 3-(methacrylamido)-propyltrimethylammonium chloride, vinyl methyl ether, vinyl ethyl ether, alkali metal and ammonium salts of vinyl sulfonic acid, vinyl pyridine, vinyl pyrrolidone, vinyl imidazole, diallyldimethylammonium chloride, styrene sulfonic acid and its salts, and the like. Preferably, the monomers are selected from acrylamide, acrylic acid and its salts, a quaternary of dimethylaminoethyl methacrylate, and 3-(methacrylamido) propyltrimethylammonium chloride. Most preferably the polymer is polyacrylamide, a copolymer of acrylamide and acrylic acid or its salts, or a copolymer of acrylamide and a quaternary of dimethylaminoethyl methacrylate.

Any conventional chain transfer agent may be employed, such as propylene glycol, isopropanol, 2-mercaptoethanol, sodium hypophosphite, dodecyl mercaptan and thioglycolic acid. The chain transfer agent is generally present in an amount of about 0.1 to 10 percent by weight of the total emulsion, though more may be used.

The initiator may be any free radical producing material well known in the art. The preferred free radical initiators are the redox-type and the azo-type polymerization initiators an they are generally used in an amount of about 0.0005 to 0.5 percent by weight of the total emulsion. Radiation may also be used to initiate the reaction.

Any conventional sequesterant may also be present in the aqueous phase, such as ethylenediaminetetraacetic acid or pentasodium diethylenetriamine pentaacetate. The sequesterant is generally present in an amount of about 0.01 to 2 percent by weight of the total emulsion, though more may be utilized.

Following completion of the polymerization, the pH of the emulsion may be adjusted as desired. For an anionic polymer emulsion, this is generally about 4 to 10; for cationic emulsions about 2.0 to 5.5; and for nonionic emulsions about 2.0 to 7.0. A breaker surfactant is generally added to yield a single package of final product, any suitable breaker surfactant may be employed, experimentation being the best means of determining which breaker surfactant will perform optimally with a given emulsion system. Typical breaker surfactants include those having relatively high HLB numbers such as ethoxylated nonyl phenols, ethoxylated nonyl phenol formaldehyde resin, polyethylene oxide esters, dioctyl esters of sodium sulfosuccinate and others disclosed in U.S. Pat. No. 3,624,019 incorporated herein by reference. Typically, the breaker surfactant is added in an amount equal to about 0.5 to 5 percent by weight, based on the total emulsion. Preferably the amount is less than 3 percent and most preferably less than about 2.5 percent. It is an additional benefit of the present invention that the amount of the breaker surfactant required may be reduced below that amount which would otherwise be required.

Once prepared, the emulsions of the present invention may be chemically modified in any known manner. "Chemically modified" intended to cover further treatment of the dispersed water-soluble polymer and/or the addition of components to the dispersed water-soluble polymer which, without the stabilization provided by the emulsion stabilizers, would cause the normally water-soluble polymeric particles to coagulate or agglomerate. Examples of such further treatments are disclosed in U.S. Pat. Nos. 4,052,353 and 4,171,296, incorporated herein by reference. The emulsion of the present invention may also be concentrated in any suitable manner, such as disclosed in U.S. Pat. No. 4,021,399, incorporated herein by reference.

The following examples are illustrative of the present invention, but are not in any way a limitation thereof. All parts are by weight unless otherwise specified.

EXAMPLE I

A water phase containing 260 g. of acrylamide, 1.2 g. of ethylenediaminetetraacetic acid, 0.5 g. of potassium bromate, and 431.6 g. of water is homogenized with an oil phase containing 240 g. of oil, 12.5 g. of hydrogenated ricinoleic acid triglyceride which has been ethoxylated with five moles of ethylene oxide and 4.1 g. of sorbitan monooleate. The resulting emulsion system is sparged with nitrogen. 23.5 g. of a 4.5% solution of sodium bisulfite is added continuously during the polymerization and the temperature of the emulsion increases to about 35°–40° C. Cooling is provided to maintain this temperature and agitation is maintained for 4–10 hours. The polymerization is completed at the end of that time and results in a non-ionic polyacrylamide emulsion having 26 percent polymer solids.

The emulsion is split into two portions of 486.7 g. each. To one portion (A) is added 12.0 g. of a mixture of polyethylene glycol sesquioleate, polyethylene glycol dioleate and ethoxylated nonyl phenol (the "breaker system") to yield a one package product. To the other portion (B) is added the same 12.0 g. of the breaker system along with 1.3 g. of a n-dodecenylsuccinic anhydride.

The two finished emulsions are then evaluated for mechanical stability and freeze-thaw stability as follows:

1. Mechanical Stability

Mechanical stability of each water-in-oil emulsion is determined by placing 50 grams of a final emulsion on a magnetic stirrer in a glass jar containing the emulsion and a heavy magnetic stirring bar. The unit is allowed to stir at a fixed speed of 1,000 to 1,500 rpm until gel particles form or the contents of the jar solidifies. The test is conducted from a minimum time period of 100 hours, typically for 1,000 hours. Products passing the 100 hours are usually field acceptable; products passing the 1,000 hours are acceptable under all field conditions.

2. Freeze-Thaw Stability

The laboratory test for freeze-thaw stability is as follows: approximately 200 grams of the emulsion product being tested is placed in a pint jar and is frozen down in a cryogenic unit to about −20° C., and held at that temperature for an extended period of time, i.e. overnight. The sample is then removed from the unit and placed in a thawing both at a temperature of about 45°–50° C. After thawing (generally 30 to 60 minutes), the samples are evaluated by determining the size and number of gel particles that have formed wherein "large gels" are equal to or greater than about 1" by about ⅛" by about 1/16" and "small gels" are smaller than this size.

Then, unless the product has completely gelled, the cycle is repeated until the product gels of for a maximum of five cycles, though typically only three cycles are performed.

Emulsion A, which represents the prior art, passed the mechanical stability test with 1,000 hours but failed the freeze-thaw test by being completely gelled after the first cycle.

Emulsion B, which represents the present invention, passed the mechanical stability test with 1,000 hours and showed only 14 small gels after the first cycle; 2 large and 15 small gels after the second cycle; and 6 large and 9 small gels after the third cycle. Obviously, the fewer the gel particles, the better the freeze-thaw protection. In this case there were only 15 total gel particles detected after the third cycle. Thus the n-dodecenylsuccinic anhydride provided superior protection.

EXAMPLE II

The basic procedure of Example I is repeated except that the n-dodecenylsuccinic anhydride is replaced by a variety of other succinic anhydrides. The anhydrides tested and the results obtained are shown in Table I below.

TABLE I

| | Freeze-Thaw Comparison Study | | |
|---|---|---|---|
| Additive | Cycle 1 | Cycle 2 | Cycle 3 |
| None | Gelled | — | — |
| n-Dodecenyl SA | 14 Small | 2 Large | 6 Large |
| | | 15 Small | 9 Small |
| n-Octadecenyl SA | 2 Large | 2 Large | 4 Large |
| | 15 Small | 23 Small | 23 Small |
| Branched-Dodecenyl SA | 5 Large | 4 Large | 9 Large |
| | 20 Small | 28 Small | 20 Small |
| n-Pentenyl SA | 7 Large | 10 Large | 6 Large |
| | 18 Small | 28 Small | 31 Small |
| n-Octenyl SA | 3 Large | 6 Large | 9 Large |
| | 12 Small | 29 Small | 26 Small |
| Iso-Octadecenyl SA | 3 Large | 4 Large | 13 Large |
| | 22 Small | 22 Small | 17 Small |
| PA-18* | 2 Large | 8 Large | 11 Large |
| | 11 Small | 27 Small | 25 Small |
| Am Cy 1906N* | 42 Small | 58 Small | 60 Small |

Large Gels are ≧ 1" × ⅛" × 1/16"
Small Gels are ≦ 1" × 1/16 × 1/16"
SA = Succinic Anhydride
* = Comparative Examples For comparison purposes, samples are prepared having either no freeze-thaw additive or having Gulf's PA-18 which is a polymeric freeze-thaw stabilizing surfactant disclosed and claimed in U.S. Ser. No. 816,171 and which contains pendant anhydride groups along its chain length. In addition, a commercially available freeze-thaw stabilized non-ionic polyacrylamide emulsion, 1906N from American Cyanamid Company, is also tested.

As the results show, these succinic anhydrides provide equivalent or better protection than that demonstrated by the commercial material and substantially equivalent to the PA-18. However, the succinic anhydrides are substantially less costly than the PA-18 and are more soluble in oil with lower titres which facilitates their handling and use.

EXAMPLE III

The basic procedure of Example I is repeated except that the n-dodecenylsuccinic anhydride is incorporated into the oil phase before homogenization and not added with the breaker system after polymerization. The resultant emulsion passes both the mechanical stability and freeze-thaw tests as had Emulsion B of Example I.

EXAMPLE IV

The basic procedure of Example I is repeated except that 20% of the hydrogenated ethoxylated ricinoleic acid triglyceride is replaced by an equal amount of non-hydrogenated ricinoleic acid triglyceride ethoxylated with five moles of ethylene oxide and 15 weight percent of the acrylamide is replaced by sodium acrylate.

For comparison purposes a commercially available anionic emulsion, Nalco's 7533, and a sample containing Gulf's PA-18, are also evaluated. The results shown in Table II demonstrate the superior performance obtained by the present invention.

TABLE II

| Sample | Freeze-Thaw Comparison Study | | |
|---|---|---|---|
| | Cycle 1 | Cycle 2 | Cycle 3 |
| n-Dodecenyl SA | 4 Small | 6 Small | 7 Small |
| PA-18* | 4 Small | 18 Small | 1 Large |
| | | | 10 Small |
| Nalco 7533 | 15 Small | 2 Large | 3 Large |
| | | 40 Small | 60 Small |
| None | 5 Large | gelled | |
| | 50 Small | | |

Large Gels are ≧ 1" × ¼" × 1/16"
Small Gels are ≦ 1" × 1/16 × 1/16"
SA = Succinic Anhydride

EXAMPLE V

The basic procedure of Example IV is repeated except that the sodium acrylate is replaced by an equivalent weight of a cationic monomer: dimethylaminoethyl methacrylate methyl chloride quaternary. The emulsion which contains the dodecenylsuccinic anhydride shows only 25 small gels after the third cycle while the one which contains no additive gels after the second cycle.

Numerous modifications and variations of the present invention are possible in light of the foregoing disclosure and, therefore within the scope of the appended claims, the invention may be practiced otherwise than is particularly described.

What is claimed is:

1. A method of freeze-thaw stabilizing a water-in-oil emulsion of a water-soluble polymer having less than about 50 percent by weight polymeric solids comprising adding thereto a freeze-thaw stabilizing amount of a succinic anhydride compound of the formula:

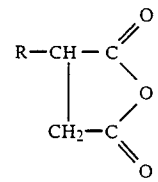

wherein R is a substituted or unsubstituted alkyl or alkenyl group having about 5 to about 30 carbon atoms and wherein the substituents are selected from aryl and alkyl substituted aryl groups.

2. The method of claim 1 wherein the water-soluble polymer is a polymer comprised of monomers selected from acrylamide, acrylic acid and its salts, methacrylamide, methacrylic acid and its salts, maleic acid and its salts, methyl acrylate, ethyl acrylate, propyl acrylate, methyl methacrylate, ethyl methacrylate, dimethylaminoethyl acrylate and its methylchloride and methosulfate quaternaries, diethylaminoethyl acrylate and its methylchloride and methosulfate quaternaries, diethylaminoethyl methacrylate and its methylchloride and methosulfate quaternaries, hydroxyethyl acrylate, hydroxyethyl methacrylate, hydroxypropyl acrylate, hydroxypropyl methacrylate, vinyl acetate, styrene, acrylonitrile, 2-acrylamido-methylpropane sulfonic acid and its salts, 3-(methacrylamido)propyl-trimethylammonium chloride, vinyl methyl ether, vinyl pyridine, vinyl pyrrolidone, vinyl imidazole, diallyldimethylammonium chloride, styrene sulfonic acid and its salts, or mixtures thereof.

3. The method of claim 1 wherein the water-soluble polymer is present in an amount of about 20 to 35 percent by weight, based on the total emulsion.

4. The method of claim 1 wherein the succinic anhydride is employed in an amount equal to or greater than about 0.25 percent by weight, based on the total emulsion.

5. The method of claim 1 wherein the succinic anhydride is added to the emulsion prior to commencement of polymerization.

6. The method of claim 1 wherein the succinic anhydride is added to the emulsion after completion of the polymerization.

7. The emulsion of claim 1 wherein the succinic anhydride is blended with an inverting breaker surfactant prior to its addition to the emulsion.

8. The method of claim 1 wherein the water-soluble polymer is selected from the group consisting of polyacrylamide, a copolymer of acrylamide and less than about 25 mole percent acrylic acid or its salts, and a copolymer of acrylamide and less than about 10 mole percent of a quaternary of dimethylaminoethyl methacrylate.

9. The method of claim 1 wherein R has about 8 to about 18 carbon atoms.

10. The method of claim 1 wherein R is a straight chain.

11. The method of claim 1 wherein R is alkyl.

12. The method of claim 1 wherein R is alkenyl.

13. The method of claim 1 wherein R is n-dodecenyl.

* * * * *